United States Patent [19]

Yoshida

[11] Patent Number: 6,087,008
[45] Date of Patent: Jul. 11, 2000

[54] THERMAL TRANSFER MATERIAL

[75] Inventor: Katsuhiro Yoshida, Osaka, Japan

[73] Assignee: Fujicopian Co., Ltd., Osaka, Japan

[21] Appl. No.: 09/037,189

[22] Filed: Mar. 9, 1998

[30] Foreign Application Priority Data

Mar. 11, 1997 [JP] Japan ................................. 9-056460

[51] Int. Cl.⁷ .................................................. B41M 5/26
[52] U.S. Cl. ........................ 428/412; 428/195; 428/500; 428/913; 428/914
[58] Field of Search ................................ 428/195, 413, 428/913, 914

[56] References Cited

U.S. PATENT DOCUMENTS 5,459,598 10/1995 Carrington ............................ 359/81

FOREIGN PATENT DOCUMENTS

| | | | |
|---|---|---|---|
| 0 798 128 A1 | 10/1997 | European Pat. Off. | B41M 5/38 |
| 0 806 302 A1 | 11/1997 | European Pat. Off. | B41M 5/38 |
| 05016533 | 1/1993 | Japan | B41M 5/30 |
| WO 94/25282 | 11/1994 | WIPO | B41M 5/38 |
| WO 97/50016 | 12/1997 | WIPO | B41M 5/40 |

*Primary Examiner*—Bruce Hess
*Attorney, Agent, or Firm*—Fish & Neave

[57] ABSTRACT

A thermal transfer material favorably used for forming images or patterns by means of thermal transfer, especially a spacer for liquid crystal display panels and a dot spacer for switching devices such as touch panel is disclosed which comprises a foundation and a heat-sensitive transferable layer provided on the foundation, the heat-sensitive transferable layer comprising an acrylic copolymer containing at least recurring units derived from glycidyl (meth)acrylate and/or an epoxy resin containing two or more epoxy groups in one molecule, and a curing agent containing carboxyl group.

7 Claims, No Drawings

THERMAL TRANSFER MATERIAL

BACKGROUND OF THE INVENTION

The present invention relates to a thermal transfer material. More particularly, it relates to a thermal transfer material favorably used for forming images or patterns by means of thermal transfer, especially a spacer for liquid crystal display panels and a dot spacer for switching devices such as touch panel.

Conventional methods for forming a spacer which is interposed between two substrates constituting a liquid crystal display panel and supports the substrates include a method of scattering glass beads as a common method. However, in this method it is difficult to uniformly scatter the glass beads, resulting in unevenness in the distribution of the glass beads.

Recently, there is proposed a method wherein a photopolymerizable resin layer is formed on a temporary support and dots are formed from the layer by photolithography, yielding a transfer sheet, and the dots on the transfer sheet are transferred onto a substrate for liquid crystal display panel, the dots transferred onto the substrate serving as a spacer (JP-A-7-152038).

Methods for forming a dot spacer for a touch panel and the like include a method using screen printing as a common method (e.g. JP-A-8-101740).

However, since the aforesaid conventional methods for forming dot spacers utilize photolithography or printing methods, they require large scale systems and troublesome operations.

In view of the foregoing, a main object of the present invention is to provide a means for simply forming a dot spacer.

This and other objects will become apparent from the description hereinafter.

SUMMARY OF THE INVENTION

The present inventor has discovered that when thermal transfer technology wherein a thermal transfer material is used and transfer is preferably performed in dots by means of a printer equipped with a thermal head is utilized, a dot spacer can be simply formed and further investigated to discover a thermal transfer material capable of satisfying properties such as solvent resistance, heat resistance and transparency required for a dot spacer without hindering the transferability, leading to the completion of the present invention.

The present invention provides: (1) a thermal transfer material comprising a foundation and a heat-sensitive transferable layer provided on the foundation, the heat-sensitive transferable layer comprising an acrylic copolymer containing at least recurring units derived from glycidyl (meth)acrylate, and a curing agent containing carboxyl group.

The present invention provides: (2) a thermal transfer material comprising a foundation and a heat-sensitive transferable layer provided on the foundation, the heat-sensitive transferable layer comprising an epoxy resin containing two or more epoxy groups in one molecule, and a curing agent containing carboxyl group.

The present invention provides: (3) a thermal transfer material comprising a foundation and a heat-sensitive transferable layer provided on the foundation, the heat-sensitive transferable layer comprising an acrylic copolymer containing at least recurring units derived from glycidyl (meth)acrylate, an epoxy resin containing two or more epoxy groups in one molecule, and a curing agent containing carboxyl group.

The present invention provides: (4) the thermal transfer material of any one of the above (1), (2) or (3), wherein the curing agent containing carboxyl group is a copolymer comprising at least one component selected from the group consisting of maleic acid, maleic acid half ester, maleic anhydride, methacrylic acid and acrylic acid, and at least one component selected from the group consisting of a styrene monomer, a methacrylic acid ester and an acrylic acid ester.

The present invention provides: (5) the thermal transfer material of any one of the above (1) or (3), herein the acrylic copolymer has an average molecular weight of $3 \times 10^3$ to $50 \times 10^4$.

The present invention provides: (6) the thermal transfer material of any one of the above (2) or (3), wherein the epoxy resin has an average molecular weight of 500 to $3 \times 10^4$.

Herein, the term "glycidyl (meth)acrylate" refers to glycidyl methacrylate and/or glycidyl acrylate.

DETAILED DESCRIPTION

In the present invention, by use of a thermal transfer material having on a foundation a heat-sensitive transferable layer comprising an acrylic copolymer containing at least recurring units derived from glycidyl (meth)acrylate and/or an epoxy resin containing two or more epoxy groups in one molecule, and a curing agent containing carboxyl group, dots having a suitable shape as dots for a spacer can be formed on a substrate with good transferability and when the dots formed on the substrate are cured, they become dots each composed of a cured product having a three-dimensional network structure. Thus, one can obtain dots for a spacer having good solvent resistance, heat resistance and transparency.

In particular, when as the curing agent having carboxyl group one uses a copolymer comprising at least one component selected from the group consisting of maleic acid, maleic acid half ester, maleic anhydride, methacrylic acid and acrylic acid, and at least one component selected from the group consisting of a styrene monomer, a methacrylic acid ester and an acrylic acid ester, it is possible to suppress the curing reaction of the resin component to the lowest level possible on storage or the like, and in curing the transferred dots, the dots can be sufficiently cured at relatively low temperatures. Thus, dots for a spacer having better solvent resistance, heat resistance and transparency can be obtained.

The present invention will be described more specifically.

Examples of the acrylic copolymer (hereinafter, in some cases, referred to as "glycidyl group-containing acrylic copolymer") containing at least recurring units derived from glycidyl (meth)acrylate (hereinafter, in some cases, referred to as "glycidyl (meth)acrylate unit") which is used in the present invention include copolymers of glycidyl methacrylate and/or glycidyl acrylate and at least one other copolymerizable monomer, e.g. alkyl (meth)acrylates wherein the alkyl group has 1 to 18 carbon atoms, such as methyl (meth)acrylate, ethyl (meth)acrylate, isopropyl (meth)acrylate, n-propyl (meth)acrylate, isobutyl (meth)acrylate, tert-butyl (meth)acrylate, n-butyl (meth)acrylate, cyclohexyl (meth)acrylate, octyl (meth)acrylate, dodecyl (meth)acrylate and octadecyl (meth)acrylate; styrene monomers such as styrene and α-methylstyrene. These glycidyl group-containing acrylic copolymers may be used either alone or in combination of two or more species thereof.

The glycidyl group-containing acrylic copolymer preferably has an average molecular weight (weight average molecular weight, hereinafter the same) of $3 \times 10^3$ to $50 \times 10^4$, particularly $5 \times 10^3$ to $20 \times 10^4$. The content of the glycidyl (meth)acrylate unit is preferably from 5 to 90% by weight. When the average molecular weight is smaller than the above range, it is difficult to obtain a sufficiently cured product of three-dimensional network structure and the resulting cured product is prone to be insufficient in solvent resistance and heat resistance. When the average molecular weight is larger than the above range, the transferability is prone to be degraded. When the content of the glyciydyl (meth)acrylate unit is lower than the above range, it is difficult to obtain a sufficiently cured product and the resulting cured product is prone to be insufficient in solvent resistance and heat resistance. When the content of the glycidyl (meth)acrylate unit is higher than the above range, the transferability is prone to be degraded. From the standpoint of the transferability, the glycidyl group-containing acrylic copolymer preferably has a glass transition point of 40° to 130° C.

The epoxy resin used in the present invention is one containing two or more epoxy groups. Examples of the epoxy resin include glycidyl ether type epoxy resins such as tetraphenolethane tetraglycidyl ether, 9,9-bis(4-hydroxyphenyl)fluorene diglycidyl ether, phenol novolak polyglycidyl ether, cresol novolak polyglycidyl ether, bisphenol A diglycidyl ether, hydrogenated bisphenol A diglycidyl ether, bisphenol F diglycidyl ether, bisphenol S diglycidyl ether, and bisphenol AD diglycidyl ether; glycidyl amine type epoxy resins such as tetraglycidylaminodiphenylmethane, triglycidyl isocyanurate and glycidylaniline; glycidyl ester type epoxy resins such as dimer acid diglycidyl ester, hexahydrophthalic acid diglycidyl ester and methyltetrahydrophthalic acid diglycidyl ester; alicyclic type epoxy resins such as 3,4-epoxycyclohexylmethyl 3,4-epoxycyclohexanecarboxylate and vinylcyclohexene dioxide. These epoxy resins may be used either alone or in combinations of two or more species thereof.

Among the aforesaid epoxy resins, glycidyl ether type epoxy resins such as bisphenol A diglycidyl ether, hydrogenated bisphenol A diglycidyl ether, bisphenol F diglycidyl ether, bisphenol S diglycidyl ether and bisphenol AD diglycidyl ether are preferred because they are excellent in transferability and give a cured product having excellent solvent resistance, heat resistance and transparency.

The epoxy resin preferably has an average molecular weight of 500 to $3 \times 10^4$, particularly 500 to $1 \times 10^4$. The epoxy resin more preferably has an epoxy equivalent of 180 to 1,000 (g/eq). When the average molecular weight is smaller than the above range, it is difficult to obtain a sufficiently cured product and the resulting cured product is prone to be insufficient in solvent resistance and heat resistance. When the average molecular weight is larger than the above range, the transferability is prone to be degraded. When the epoxy equivalent is smaller than the above range, it is difficult to obtain a sufficiently cured product and the resulting cured product is prone to be insufficient in solvent resistance and heat resistance. When the epoxy equivalent is larger than the above range, it is also difficult to obtain a sufficiently cured product. From the standpoint of the transferability, the epoxy resin preferably has a softening point of 60° to 150° C.

In the present invention, the glycidyl group-containing acrylic copolymer and the epoxy resin may be used either alone or in combination. When both resins are used in combination, it is preferable that the proportion of the glycidyl group-containing acrylic copolymer is from 50 to 80% by weight relative to the total amount of both resins to achieve the desired transparency.

In the present invention, preferable as the aforesaid carboxyl group-containing curing agent is a copolymer (hereinafter referred to as "carboxyl group-containing copolymer") comprising at least one component (A) selected from the group consisting of maleic acid, maleic acid half ester, maleic anhydride, methacrylic acid and acrylic acid, and at least one component (B) selected from the group consisting of a styrene monomer, a methacrylic acid ester and an acrylic acid ester.

Preferable examples of the maleic half ester, methacrylic acid ester or acrylic acid ester are alkyl esters wherein the alkyl group is unsubstituted or substituted alkyl group having 1 to 12 carbon atoms. Examples of the styrene monomer are styrene and α-methyl styrene.

The carboxyl group-containing copolymer preferably has a content of component (A) of 10 to 90% by weight. When the content of component (A) is lower than the above range, the curing performance is prone to be degraded. A content of component (A) of higher than the above range exerts an adverse influence on the transferability.

Among the aforesaid carboxyl group-containing copolymers, styrene-maleic acid half ester copolymer, styrene-acrylic acid copolymer, styrene-maleic anhydride copolymer and styrene-methacrylic acid copolymer are preferred for improved curing performance.

The carboxyl group-containing copolymer preferably has an average molecular weight of $1 \times 10^3$ to $10 \times 10^4$. When the average molecular weight is smaller than the above range, it is difficult to obtain a sufficiently cured product. When the average molecular weight is larger than the above range, the transferability is prone to be adversely affected. The carboxyl group-containing copolymer as a curing agent serves as a vehicle upon thermal transfer. Because of this, the carboxyl group-containing copolymer preferably has a glass transition point of 40° to 130° C.

The proportion of the carboxyl group-containing curing agent, especially the carboxyl group-containing copolymer to the glycidyl group-containing acrylic copolymer and/or the epoxy resin (hereinafter, in some cases, referred to as "resin component") is preferably from 30 to 60 parts by weight to 100 parts by weight of the resin component. When the proportion of the carboxyl group-containing curing agent is smaller than the above range, it is difficult to obtain a sufficiently cured product and the resulting cured product is prone to be insufficient in solvent resistance and heat resistance. When the proportion of the carboxyl group-containing curing agent is larger than the above range, the transparency is prone to be degraded.

The heat-sensitive transferable layer according to the present invention comprises the aforesaid resin component and curing agent. However, the heat-sensitive transferable layer may be further incorporated with additives such as coloring agents (e.g. pigments) and body pigment, as required, within a range wherein the object of the present invention is not hindered.

The thermal transfer material of the present invention can be obtained by applying and drying a coating liquid for heat-sensitive transferable layer onto a foundation to give a heat-sensitive transferable layer. The coating liquid can be prepared by dissolving or dispersing the aforesaid resin component and curing agent, and optionally other additives into a suitable solvent.

The coating amount (coating amount after being dried, hereinafter the same) of the heat-sensitive transferable layer is appropriately determined depending upon the size of a desired dot spacer or the like. Usually, however, the coating amount is selected from the range of 1 to 10 g/m².

As the foundation, one can use various plastic films commonly used as a foundation film for ink ribbons of this type, inclusive of polyethylene terephthalate film as a typical example. The thickness of the foundation is usually from about 1 μm to about 10 μm. A heat-resistant back layer (sticking preventive layer) may be formed on the back side (the side to be brought into slide contact with a thermal head) of the foundation. Examples of materials for the heat-resistant back layer include various heat-resistant resins; such as silicone resins, silicone-modified urethane resins and silicone-modified acrylic resins, and mixtures of the foregoing heat-resistant resins and lubricating agents.

In the thermal transfer material of the present invention, a release layer composed of a wax as a main component may be interposed between the foundation and the heat-sensitive transferable layer when the heat-sensitive transferable layer shows poor release properties upon thermal transfer.

The formation of dot-shaped transferred product onto a receptor using the thermal transfer material of the present invention can be performed by superimposing the heat-sensitive transferable layer of the thermal transfer material onto the receptor and applying heat energy to the heat-sensitive transferable layer in a dot-like pattern. A thermal head is generally used as a heat source for the heat energy. However, any conventional heat sources such as laser beam, infrared flash and heat pen can be used.

When the receptor is not a sheet-like one but a three-dimensional one, or one having a curved surface, thermal transfer using laser beam is advantageous.

The transferred product obtained on a receptor such as an appropriate substrate by thermal transfer using the thermal transfer material of the present invention can be cured, for example, by heating at a temperature of 130° to 150° C. for 30 to 60 minutes in an oven.

The thermal transfer material of the present invention is favorably used for forming a spacer for liquid crystal display panels and a dot spacer for switching devices such as touch panel. Of course, the thermal transfer material of the present invention can be used for forming other patterns or images (including characters and marks) for which solvent resistance and heat resistance are required.

The present invention will be described in detail by way of Examples and Comparative Example. It is to be understood that the present invention will not be limited to these Examples, and various changes and modifications may be made in the invention without departing from the spirit and scope thereof.

EXAMPLES 1 TO 4 AND COMPARATIVE EXAMPLE

On one side of a 5 μm-thick polyethylene terephthalate film was formed a sticking preventive layer composed of a silicone resin with a coating amount of 0.25 g/m². Onto the opposite side of the polyethylene terephthalate film with respect to the sticking preventive layer was applied a coating liquid of the formulation shown in Table 1 and dried at 80° C. to form a heat-sensitive transferable layer with a coating amount of 2 g/m².

TABLE 1

| Formulation (% by weight) | Ex. 1 | Ex. 2 | Ex. 3 | Ex. 4 | Com. Ex. |
|---|---|---|---|---|---|
| Glycidyl group-containing acrylic resin A*1 | 13 | | | | |
| Glycidyl group-containing acrylic resin B*2 | | 12 | | 6 | |
| Glycidyl group-containing acrylic resin C*3 | | | | | 18 |
| Epikote 1003*4 | | | 13 | | |
| Epikote YL-6571*5 | | | | 6 | |
| Styrene-maleic acid half ester copolymer*6 | 7 | | 7 | | |
| Styrene-acrylic acid*7 | | 8 | | 8 | |
| Amine type curing agent*8 | | | | | 2 |
| Cellosolve acetate | 12 | 12 | 12 | 12 | |
| Methyl ethyl ketone | 68 | 68 | 68 | 68 | 80 |

*1: Glycidyl methacrylate/methyl methacrylate copolymer, average molecular weight: 12 × 10⁴, glass transition point: 57° C.
*2: Glycidyl methacrylate/styrene copolymer, average molecular weight: 10 × 10⁴, glass transition point: 68° C.
*3: Glycidyl methacrylate/methyl methacrylate copolymer, average molecular weight: 2 × 10³, glass transition point: 70° C.
*4: Bisphenol A diglycidyl ether made by Yuka Shell Epoxy Kabushiki Kaisha, average molecular weight: 1.6 × 10³, epoxy equivalent: 770, softening point: 89° C.
*5: Hydrogenated bisphenol A diglycidyl ether made by Yuka Shell Epoxy Kabushiki Kaisha, average molecular weight: 1.8 × 10³, epoxy equivalent: 878, softening point: 81° C.
*6: Glass transition point: 72° C.
*7: Glass transition point: 101° C.
*8: Amicure PN-23 made by Ajinomoto Co., Inc.

Each of the obtained thermal transfer materials was evaluated for transferability, heat resistance, solvent resistance and transparency by the following methods. The results are shown in Table 2.

Transferability

Each of the thermal transfer materials was used to transfer a one-dot pattern by means of a thermal transfer type bar code printer (B-30 made by TEC Corporation) under the following conditions, and the state of the transferred one-dot pattern was examined.

Applied energy: 22.6 mJ/mm²

Printing speed: 2 inches/sec.

Platen pressure: "Strong" in terms of an indication prescribed in the printer

Receptor: 100 μm-thick polyethylene terephthalate film

Evaluation criteria

A: One dot is perfectly transferred.

B: A large portion of one dot is transferred.

C: A half of one dot is transferred.

Heat resistance

Each of the thermal transfer materials was used to transfer a solid pattern onto the same receptor as used above by means of the thermal transfer type bar code printer (B-30 made by TEC Corporation). The transferred pattern was thermally cured using 130° C. for one hour. The cured product was scraped off and about 10 mg thereof was weighed out with an electronic scale. After being subjected to a heat treatment condition of 250° C. for one hour in an oven, the weight of the cured product was again measured. The residual ratio defined by the following formula was determined to evaluate the heat resistance.

$$\text{Residual ratio (\%)} = \frac{\text{Weight after heat treatment}}{\text{Weight before heat treatment}} \times 100$$

Evaluation criteria
  A: not less than 95%
  B: not less than 90%, less than 95%
  C: not less than 80%, less than 90%
  D: not less than 70%, less than 80%
  E: less than 70%

Solvent resistance

Each of the thermal transfer materials was used to transfer a solid pattern onto the same receptor as used above by means of the thermal transfer type bar code printer (B-30 made by TEC Corporation). The transferred pattern was thermally cured using 130° C. x one hour. The cured transferred pattern was subjected to a rubbing treatment under the following conditions to evaluate the solvent resistance.

Tester: A.A.T.C.C. Crock Meter Model CM-1 made by ATLAS ELECTRIC DEVICE COMPANY
  Rubbing material: Cotton cloth impregnated with acetone
  Pressure: 500 g/cm$^2$
  Number of reciprocations: 30

Evaluation criteria
  A: The transferred pattern is not removed at all.
  B: The transferred pattern is a little removed.
  C: The transferred pattern is removed and disappears.

Transparency

The same procedures as in the above evaluation method for transferability were used except that the pattern was changed to a solid pattern. The transferred pattern was thermally cured using 130° C. for one hour. The spectral transmittance of the cured transferred product was measured in a wavelength range of 380 to 780 nm to evaluate the transparency.

Evaluation criteria
  A: not less than 85%
  B: not less than 70%, less than 85%
  C: less than 70%

TABLE 2

| | Transferability | Heat resistance | Solvent resistance | Transparency |
|---|---|---|---|---|
| Ex. 1 | A | A | A | A |
| Ex. 2 | A | A | A | A |
| Ex. 3 | A | A | A | A |
| Ex. 4 | A | A | A | A |
| Com. Ex. | A | C | C | C |

The use of the thermal transfer material of the present invention for thermal transfer provides transferred matters in good dot form with good transferability, which are cured to offer images or patterns composed of cured product with excellent solvent resistance, heat resistance and transparency. Accordingly, the thermal transfer material of the present invention is favorably used for forming images or patterns by means of thermal transfer, especially a spacer for liquid crystal display panels, a dot spacer for switching devices such as touch panel, and the like.

In addition to the materials and ingredients used in the Examples, other materials and ingredients can be used in the present invention as set forth in the specification to obtain substantially the same results.

What is claimed is:

1. A thermal transfer material comprising a foundation and a heat-sensitive transferable layer provided on the foundation, the heat-sensitive transferable layer comprising an acrylic copolymer containing at least recurring units derived from glycidyl (meth)acrylate, and a curing agent containing carboxyl group;

wherein the curing agent containing carboxyl group is a copolymer comprising at least one component selected from the group consisting of maleic acid, maleic acid half ester, maleic anhydride, methacrylic acid and acrylic acid, and at least one component selected from the group consisting of a styrene monomer, a methacrylic acid ester and an acrylic acid ester.

2. The thermal transfer material of claim 1, wherein the acrylic copolymer has an average molecular weight of $3 \times 10^3$ to $50 \times 10^4$.

3. A thermal transfer material comprising a foundation and a heat-sensitive transferable layer provided on the foundation, the heat-sensitive transferable layer comprising an epoxy resin containing two or more epoxy groups in one molecule, and a curing agent containing carboxyl group;

wherein the curing agent containing carboxyl group is a copolymer comprising at least one component selected from the group consisting of maleic acid, maleic acid half ester, maleic anhydride, methacrylic acid and acrylic acid, and at least one component selected from the group consisting of a styrene monomer, a methacrylic acid ester and an acrylic acid ester.

4. The thermal transfer material of claim 3, wherein the epoxy resin has an average molecular weight of 500 to $3 \times 10^4$.

5. A thermal transfer material comprising a foundation and a heat-sensitive transferable layer provided on the foundation, the heat-sensitive transferable layer comprising an acrylic copolymer containing at least recurring units derived from glycidyl (meth)acrylate, an epoxy resin containing two or more epoxy groups in one molecule, and a curing agent containing carboxyl groups;

wherein the curing agent containing carboxyl group is a copolymer comprising at least one component selected from the group consisting of maleic acid, maleic acid half ester, maleic anhydride, methacrylic acid and acrylic acid, and at least one component selected from the group consisting of a styrene monomer, a methacrylic acid ester and an acrylic acid ester.

6. The thermal transfer material of claim 5, wherein the acrylic copolymer has an average molecular weight of $3 \times 10^3$ to $50 \times 10^4$.

7. The thermal transfer material of claim 5, wherein the epoxy resin has an average molecular weight of 500 to $3 \times 10^4$.

\* \* \* \* \*